United States Patent
Lemaitre et al.

(10) Patent No.: US 10,567,254 B2
(45) Date of Patent: Feb. 18, 2020

(54) METHOD AND DEVICE FOR CHARACTERISING A SIGNAL

(71) Applicant: SAFRAN AIRCRAFT ENGINES, Paris (FR)

(72) Inventors: Alban Lemaitre, Athis Mons (FR); Serge Le Gonidec, Vernon (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 242 days.

(21) Appl. No.: 15/034,900

(22) PCT Filed: Nov. 4, 2014

(86) PCT No.: PCT/FR2014/052789
§ 371 (c)(1),
(2) Date: May 6, 2016

(87) PCT Pub. No.: WO2015/067881
PCT Pub. Date: May 14, 2015

(65) Prior Publication Data
US 2016/0294654 A1 Oct. 6, 2016

(30) Foreign Application Priority Data
Nov. 7, 2013 (FR) ...................................... 13 60892

(51) Int. Cl.
*H04L 12/26* (2006.01)
*G05B 23/02* (2006.01)

(52) U.S. Cl.
CPC ...... *H04L 43/0823* (2013.01); *G05B 23/0262* (2013.01)

(58) Field of Classification Search
CPC . H04L 43/0823; H04L 43/08; G05B 23/0262; G05B 23/0259
(Continued)

(56) References Cited

U.S. PATENT DOCUMENTS 5,060,519 A * 10/1991 Chojitani ............ F16F 15/0275
248/550
5,459,675 A * 10/1995 Gross ....................... G05B 9/03
376/215
(Continued)

FOREIGN PATENT DOCUMENTS

DE 10 2006 031 710 A1 1/2008
JP H05-302850 A 11/1993
(Continued)

OTHER PUBLICATIONS

International Search Report dated Jan. 26, 2016 in PCT/FR2014/052789 filed Nov. 4, 2014.
French Search Report dated Oct. 1, 2014 in FR 1360892 filed Nov. 7, 2013.
Japanese Office Action issued in Japanese Patent Application No. 2016-528212 dated Oct. 9, 2018 (English Translation).

*Primary Examiner* — Kwang B Yao
*Assistant Examiner* — Syed M Bokhari
(74) *Attorney, Agent, or Firm* — Oblon, McClelland, Maier & Neustadt, L.L.P.

(57) ABSTRACT

A method of characterizing a signal, the method including acquiring a signal; and determining a vibration rating of a portion of the signal; determining a level of variation of a portion of the signal; and determining information characterizing the signal by applying a function that takes as arguments the vibration rating and the level of variation.

12 Claims, 4 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 6,199,422 | B1* | 3/2001 | Boerhout | G05B 9/03 |
| | | | | 73/1.82 |
| 2002/0084129 | A1* | 7/2002 | Fritzer | B60W 10/02 |
| | | | | 180/246 |
| 2004/0158641 | A1* | 8/2004 | Poli | H04N 21/23614 |
| | | | | 709/231 |
| 2013/0031978 | A1* | 2/2013 | Lignon | G01C 19/56 |
| | | | | 73/504.12 |
| 2014/0090472 | A1* | 4/2014 | Lysen | G01H 1/003 |
| | | | | 73/587 |
| 2014/0090476 | A1* | 4/2014 | Miller | G01L 19/0046 |
| | | | | 73/706 |

FOREIGN PATENT DOCUMENTS

| | | |
|---|---|---|
| JP | 2002-181038 A | 6/2002 |
| JP | 2002-188411 A | 7/2002 |
| JP | 2003-322335 A | 11/2003 |
| JP | 2004-227116 A | 8/2004 |
| JP | 2008-501186 A | 1/2008 |

* cited by examiner

METHOD AND DEVICE FOR CHARACTERISING A SIGNAL

BACKGROUND OF THE INVENTION

Field of the Invention

The invention relates to a method of characterizing a signal, and more particularly to a method of detecting failures by using the characterization of a signal. The invention also relates to devices for performing such methods.

Description of the Related Art

Methods for detecting failures are known. In a first step A, a signal is acquired, e.g. a signal from a sensor. Thereafter, in subsequent steps, the signal is analyzed using a failure by failure method, i.e. each type of failure is identified one by one as a function of particular characteristics of the signal. For example, a flat signal is associated with a broken cable, a saturated signal with a sensor failure, etc. Those methods are generally cumbersome to implement because of the number of failures that need to be envisaged and the complexity of the intermediate analysis operations.

In order to remedy that drawback, certain manufacturers have developed failure detection methods that are optimized for their sensors and systems. Nevertheless, that solution is not satisfactory insofar as it depends on the sensor or the computer system used. In a complex system, in which a plurality of subsystems from different manufacturers co-exist, the use of a different failure detection method for each subsystem makes controlling the system as a whole considerably more cumbersome, and it is found to be a handicap whenever it is necessary to replace a component with an equivalent component from another manufacturer.

In addition, at the risk of degrading analyses or misleading an operator, it is important to avoid detecting failures that do not exist. Indeed, false detections can have consequences that are disastrous, e.g. when the controlled system is a space vehicle. In a space vehicle, such as a rocket engine, an erroneous detection of a failure can lead to overconsumption of propellant or to performing a command that is inappropriate for the real state of the system. Thus, when the method detects a failure, it must be possible to associate that failure detection with validity information indicating whether the failure detection is or is not reliable, and it must be possible to do so in a manner that is simple and robust.

BRIEF SUMMARY OF THE INVENTION

The object of the invention is to provide a method of characterizing a signal that is simple, robust, fast, generic, and that provides reliable information about the signal.

This object is achieved by the fact that, in addition to the step A of acquiring a signal, the method comprises the following steps:

B) determining a vibration rating of at least a portion of the signal acquired in step A;

C) determining a level of variation of at least a portion of the signal acquired in step A; and D) determining information characterizing the signal by applying a function that takes as arguments at least said vibration rating and said level of variation.

The signal acquired in step A is information that varies over time. It may be analog or digital, continuous or discrete. The signal is acquired during an acquisition duration, or possibly continuously. Nevertheless, the method is performed on the basis solely of data coming from a given time window. A time window is a time interval between a start instant and an end instant.

The method also seeks to provide information at all times about the acquired signal. Subsequently, steps B, C, and D are generally repeated numerous times in iterative manner, in order to characterize the signal at different successive instants. Furthermore, at each of these iterations, steps B and/or step C is performed on the basis of signal values that have been acquired over a plurality of instants. In particular, at each iteration, step B and/or step C can be performed on the basis of the values of the signal acquired at a plurality of instants before and/or after the instant under consideration for which the information characterizing the signal is determined.

The signal may have one or more components, each of which may vary in time. A "signal" in the meaning of the invention may thus correspond to a plurality of physical signals that are aggregated in order to form a vector. Below, mention is thus made of a single signal, but it may be a scalar or a vector; with a vector signal, each time varying scalar component is designated merely by the term "component". The term "signal portion" is used to mean either a selection of one or more components of the signal from all of the components that are acquired, or else a selection of the signal at certain instants of time in the acquisition duration, or else a combination of these two kinds of selection.

The term "vibration rating" is used to designate information representing the vibration of the signal, i.e. representing the tendency of the signal to fluctuate about a value that is constant or that varies slowly, e.g. about its mean value. In particular, the vibration rating may be a function solely of the rapid fluctuations of the signal, excluding information representing slow variations of the signal, i.e. excluding information representing how the mean value of the signal varies and possibly how lower frequency harmonics vary. Conversely, the term "level of variation" is used to mean information representing slow variations of the signal, i.e.

information representative of only the variation in the mean value of the signal, or possibly of variation in its lower frequency harmonics. For example, this information is calculated over a time interval of duration that is sufficient to reveal slow variations of the signal. The level of variation may be calculated from a smoothed or averaged value of the signal. For example, the level of variation may be the rate at which the value of the signal is increasing, or a value obtained from a smoothed or averaged value of the signal.

In the present description, the ("low") frequencies that represent the slow variations of the signal and that are used for calculating the level of variation are frequencies less than or equal to the frequencies that act on the dynamics of the system from which the signal is taken.

Conversely, the frequencies used for calculating the vibration ratings, and representing only the rapid fluctuations of the signal, are frequencies that are strictly greater than the low frequencies.

By way of example, the system may be represented by a transfer function and characterized by a resonant frequency, which resonant frequency may be determined on the basis of the way in which the system reacts naturally or in response to a command given to the system.

Depending on the measured signal, its resonant frequency may be extracted from a characteristic time that is intrinsic to the system, or from a characteristic time of a transient state of the system.

The low frequencies representing slow variations of the signal are then frequencies lower than the resonant frequency, whereas frequencies higher than the resonant frequency are frequencies that represent rapid fluctuations of the signal and that are used for calculating the vibration rating. Under such circumstances, the low frequencies are representative more of the behavior of the system, while the high frequencies are representative more of noise. The resonant frequency and/or the low and high frequencies is/are determined by the person skilled in the art on the basis of knowledge about the signal that is to be characterized.

By means of such a method combining the vibration rating and the level of variation, the signal can be characterized by information in a manner that is simpler than characterizing failure by failure. By using the two primary pieces of information that are extracted (vibration rating and level of variation), and combining them, it becomes simple to obtain useful information characterizing the signal and that would otherwise not be easily accessible. In addition, this method can be applied to any signal. The combination of pieces of information that is performed in step D may, a priori, be any type of combination, ranging from an explicit mathematical operation to combining pieces of information by means of a neural network.

Compared with the state of the art in which use is generally made of a single piece of information and of a threshold, the fact of using various operators to combine two pieces of information, namely the vibration rating and the level of variation, also makes it possible to deduce various types of information from the signal depending on the operation selected for performing the combination.

In certain implementations, values of at least one indicator are determined, in particular by means of a predetermined table, from the vibration rating and/or from the level of variation; and the information characterizing the signal is determined in step D from said at least one indicator.

The term "indicator" is used to designate a value, preferably a real number, that is the result of any function applied to the vibration rating and/or to the level of variation. An indicator usually represents a specific characteristic of the signal at the instant under consideration. Determining at least one indicator from a predetermined table can be performed particularly quickly; in addition, operations performed on indicators are often simpler than operations performed on signals. The method is made particularly fast at least for these two reasons, and this can be important, in particular for real time applications.

For example, the operation that consists in determining at least one indicator from the vibration rating and/or from the level of variation by using a predetermined correspondence table can consist in giving the signal a degree of belonging to some subset. For a given subset, the degree of belonging of the signal to that subset may be 1 if the signal belongs completely to the subset, 0 if its does not belong to it at all, and any value between 0 and 1 if the signal belongs to the subset in part. This definition, specific to the field of fuzzy logic, constitutes an extension of Boolean logic in which the belonging of a signal to a set is estimated in binary manner. In addition, the person skilled in the art readily understands that the range [0, 1] is selected by way of example for practical reasons, but that any other range could take the place of [0, 1]. In fuzzy logic, subsets are referred to as linguistic variables. Thus, in this example, an indicator corresponds to a value representative of the signal relative to a linguistic variable. Preferably, a plurality of indicators are determined. The more indicators that are determined the better the signal is represented by those indicators. The indicators may be determined in parallel, thereby avoiding lengthening the time required for executing the characterization method. The indicators characterize the signal.

In addition, although the correspondence table between firstly the vibration rating and/or the level of variation and secondly the indicator(s) is predetermined, the extent of the linguistic variables (in other words the size of the subset) can be adapted to the acquired signal. For example, it is clear that it would be absurd to estimate a signal that varies over the range 1 to 2 in the same manner as a signal that varies over the range −50 to +50. The extent of the linguistic variables can thus be a predetermined function of the extent of the signal under consideration. This makes the method even more generic and makes it possible to adapt it to numerous systems and to numerous signals.

In certain implementations, the signal comprises calculated information. The term "calculated information" is used to mean the result of an operation performed on the basis of data that is not necessarily derived from measurements. Thus, the method of characterizing a signal may be applied to a signal that is synthesized or simulated completely or in part.

In certain implementations, the signal comprises information obtained using at least one sensor. This includes any value supplied by a sensor, even if it is the result of conversion operations within the sensor. Thus, the method of characterizing a signal may be applied to a physical signal acquired with one or more sensors. From the above, a signal can thus be obtained in part by calculation and in part from a sensor, in the sense that some of its components comprise calculated information and some of its components comprise information measured using at least one sensor. It is also possible to measure a signal in discrete manner, in particular using a sensor, and to add intermediate time values to that signal by performing calculation operations, typically interpolation operations.

In certain implementations, step B comprises the following substeps:

B1) extracting a vibration content from the signal acquired in step A; and

B2) calculating the vibration rating as being equal to a normalization of the vibration content obtained in step B1.

The term "vibration content" is used to mean information as a function of time obtained by subtracting from the signal its mean value and possibly its lower frequency harmonics, i.e. by subtracting quasi-static variations. The vibration content is thus a zero-mean signal. Thereafter, a vibration rating is calculated for the above-mentioned vibration content. The vibration rating may be calculated by normalizing the vibration content, i.e. by applying a function that characterizes the magnitude of the vibration content. The term "normalization" is used herein to mean a function that takes as its argument a set of data (in this example vibration content values at different instants), and delivers a result that is increasingly large when the absolute values of the data are high values. In the present example, the determination of the vibration rating by normalizing is generally performed by taking the set of all of the values of the vibration content over a given time window as the argument for the normalization. For example, the normalization may be standard deviation, which is a normalization operation performed on zero-mean signal space and which is representative of variations of the signal. Nevertheless, other normalization operations could be used. The fact of normalizing over a time window makes it possible to take account of a certain amount of the history of the signal, and thus to smooth the vibration information.

In certain implementations, the vibration rating and the level of variation are determined on the same, common portion of the signal, in particular for the same components, and in particular for all of the components of the signal itself. Characterizing a common portion of the signal possibly makes it possible to share certain intermediate calculations, thereby increasing the reliability and the speed of the method. Nevertheless, it is not obvious that this should always be done: with feedback from experience, the person skilled in the art may know that certain portions of the signal are more reliable than others for giving a first piece of information, whereas conversely, other portions of the signal are more reliable for giving a second piece of information. For example, the first piece of information may designate the vibration rating and the second piece of information may designate the level of variation. In another example, the first piece of information may designate a state of the signal, e.g. a failure state, and the second piece of information may designate a confidence index to be given to said state of the signal. The person skilled in the art selects the components of the signal that should be acquired and the operations that should be performed on these components on the basis of his prior knowledge about the various components of the signal.

In certain implementations, step B and/or step C is performed on the basis of values of the signal received during a moving time window. For example, when performing the method for real time characterization, steps B, C, and D are iterated at successive instants. Thus, at each iteration, step B and/or step C is/are performed on the basis of values acquired during the moving time window; and the time window moves in time with the different successive instants. The use of a moving time window improves the smoothing given by the vibration rating. It also makes it possible to optimize calculation, in particular calculation of the vibration rating by normalizing. Specifically, with a moving window, it is possible to perform calculations recursively, as explained below, thus achieving savings in calculation time and memory occupation.

In certain implementations, in step D, the function combines the vibration rating and the level of variation by using a threshold, an arithmetic operator, a Boolean operator, and/or a fuzzy logic operator.

By way of example, Boolean operators are AND, OR, NOT, etc. Fuzzy logic operators or fuzzy operators, are functions taking indicators as their arguments and returning a value that lies in the continuous range [0, 1]. Depending on the methods used, several implementations of the same fuzzy operator can exist. For example, a fuzzy AND may be defined merely as a product or else as a minimum. In addition, weightings can be added to the operators in order to further refine the combinations.

The invention also relates to a method of detecting failures in which a failure is detected on the basis of at least one piece of information obtained by the method as described above.

By means of the method as described for characterizing a signal, failures are detected more reliably, more quickly, and more robustly. The number of false detections is minimized.

The invention also provides a computer program including instructions for executing steps of the above-described method of characterizing a signal when said program is executed by a computer. The invention also provides a computer readable data medium containing a computer program including instructions for executing steps of the above-described method of characterizing a signal.

The invention also provides a device for characterizing a signal, the device comprising:

A) means for acquiring a signal; and
the device being characterized in that it further comprises:
B) means for determining a vibration rating suitable for determining a vibration rating of at least a portion of a signal acquired with the acquisition means A;
C) means for determining a level of variation suitable for determining a level of variation of at least a portion of a signal acquired with the acquisition means A; and
D) means for determining information characterizing the signal acquired with the acquisition means A, suitable for determining information characterizing said signal by applying a function taking as arguments at least said vibration rating and said level of variation.

In certain embodiments, the device further includes a predetermined table; and the means for determining information are suitable for determining the information by calculating at least one indicator from the vibration rating and/or the level of variation.

In certain embodiments, the means for determining the vibration rating B comprise:
B1) means for extracting a vibration content from the signal acquired in step A; and
B2) means for normalizing the vibration content extracted by the means B1.

In certain embodiments, the means B for determining the vibration rating and/or the means C for determining the level of variation are configured to use signal values received during a moving time window.

In certain embodiments, the means D for determining information are suitable for combining the vibration rating and the level of variation by using a threshold, an arithmetic operator, a Boolean operator, and/or a fuzzy logic operator.

In certain embodiments, the device is suitable for detecting a failure on the basis of at least one piece of information obtained by the means D for determining information.

BRIEF DESCRIPTION OF THE SEVERAL
VIEWS OF THE DRAWINGS

The invention can be well understood and its advantages appear better on reading the following detailed description of implementations given as non-limiting examples. The description refers to the accompanying drawings, in which.

DETAILED DESCRIPTION OF THE
INVENTION

With reference to FIGS. 1 to 4, an implementation of the method of the invention for characterizing a signal is described below.

During a step A, a time varying signal U is acquired. The value of the signal U at an instant $t$ is written U(t). In the present implementation, the signal U is a continuous scalar signal, and its acquisition continues permanently. Nevertheless, a discrete signal could be processed in analogous manner. In addition, the signal could comprise a plurality of components as explained above; it would then suffice to apply the processing described below to some or all of its components.

Figure 2:
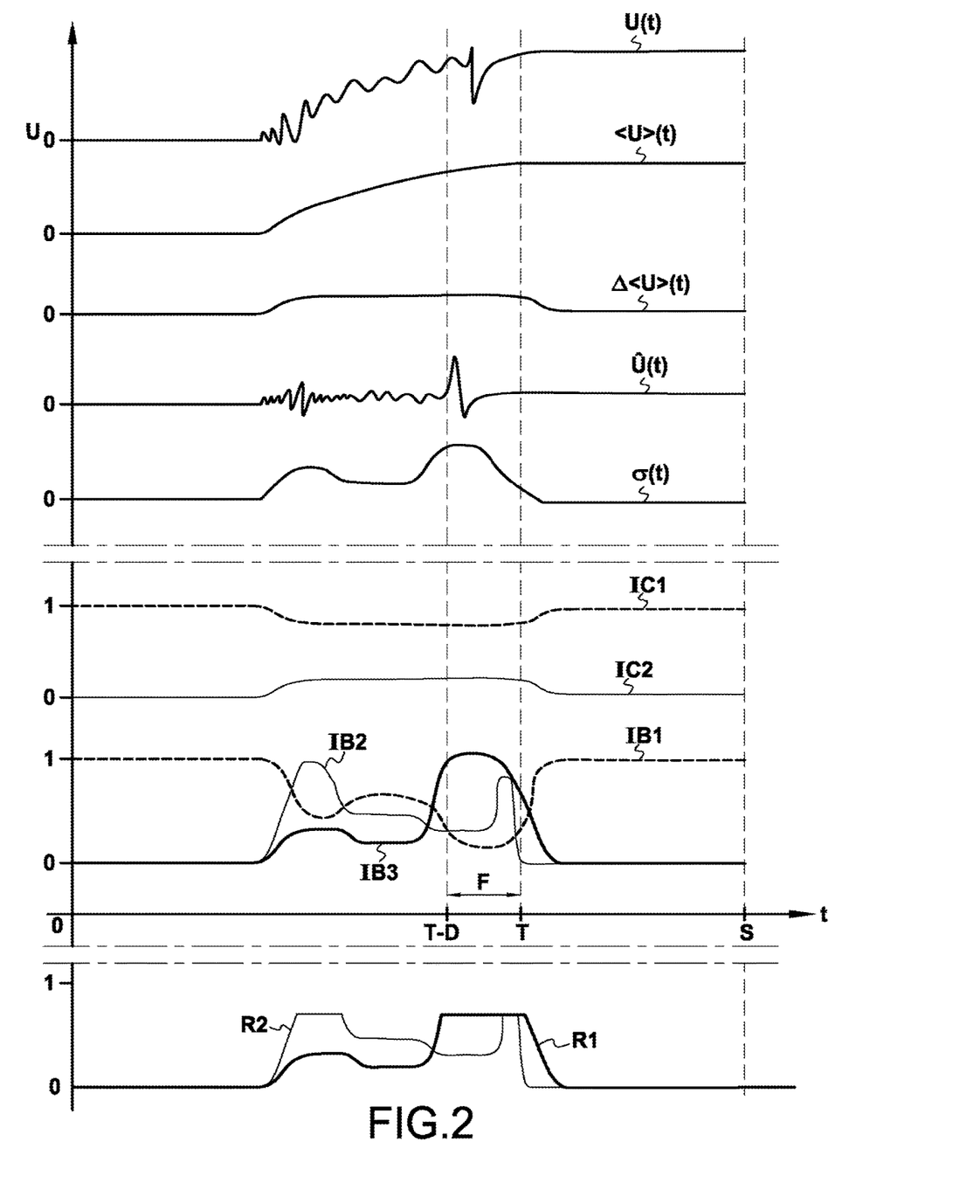
FIG. 2 is a diagrammatic view of various signals that are acquired and/or calculated by the method of the invention.

As shown in FIG. 2, consideration is given to the values of the signal acquired between an instant t=0 and an instant t=S. During this time period, consideration is given in particular to a time window F that is characterized by a time duration D. Furthermore, with a discrete signal, it is possible to select a time step Δt that is shorter than D. The time step Δt may be a multiple of the time between two successive instants at which values of the signal U are acquired in order to facilitate processing. This time step is not necessary in the case of a signal that is continuous, but it can nevertheless be used in order to simplify certain calculations, as can be seen below.

The signal U is acquired in real time. For example, the method may seek to determine information characterizing the signal at an instant T. The description below describes the implementation of the method at this instant T, and the results that are obtained are characteristic of this instant T under consideration. Under such circumstances, the local time window F used by the method is preferably the time interval [T−D, T]. The steps B, C, and D of the method are performed as described below, and then at a subsequent instant T+ΔT, the time window F is shifted so as to become the time interval [T−D+ΔT, T+ΔT] and the steps B, C, and D of the method are performed once more. This shifting is iterated throughout the time period in which variation of the signal is tracked. This constitutes the principle of a moving time window. Thus, in this implementation, the method is performed iteratively in order to characterize the acquired signal U in real time. Nevertheless, this is not the only implementation: the signal U could be acquired beforehand, once for all, and steps B, C, and D of the method could be performed a posteriori, on different time windows.

Figure 1:
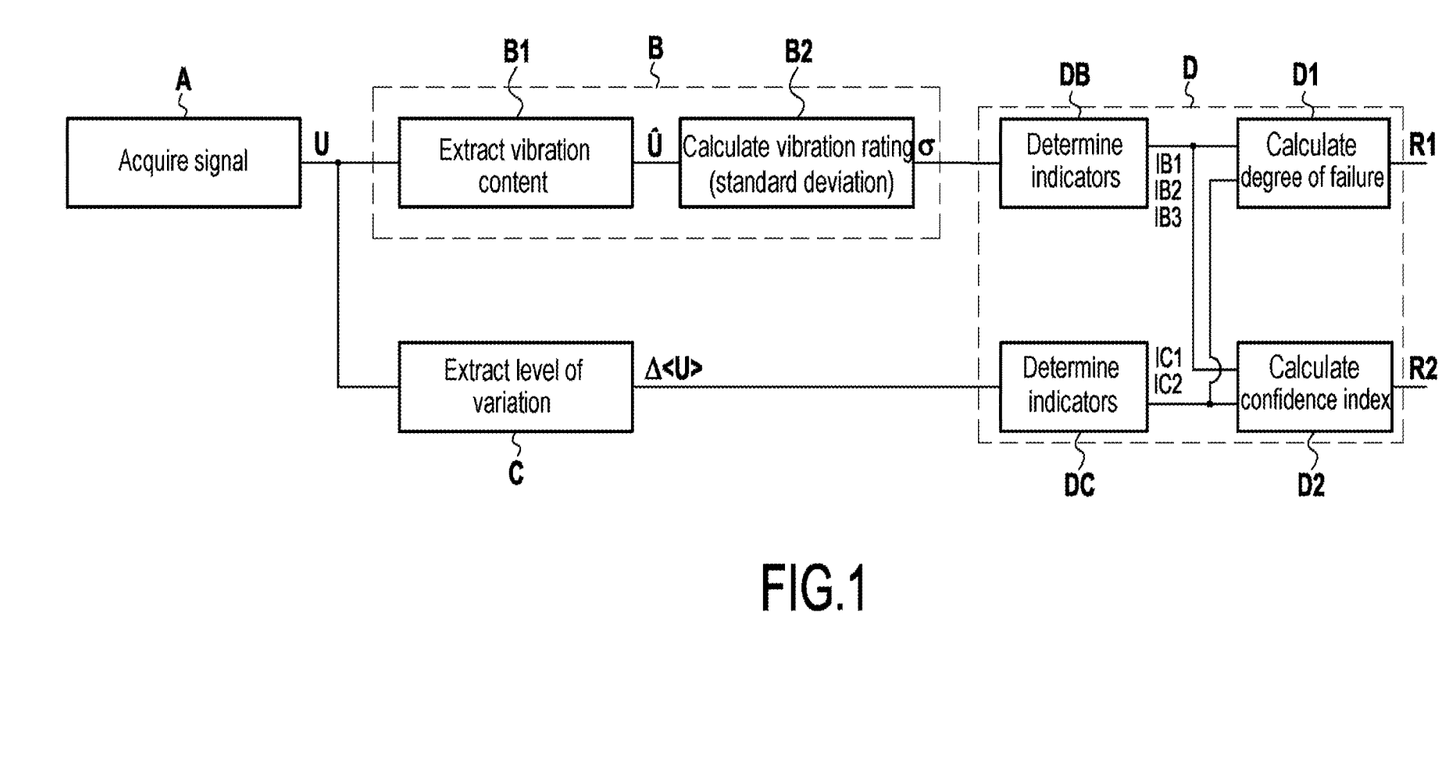
FIG. 1 is a diagrammatic view of an implementation of the method of the invention.

Steps B and C of the method may be independent, as indicated by the parallel architecture shown in FIG. 1. In order to minimize computation and make the method faster, these steps are described below as depending on each other and being performed in a preferred order.

During the step C, the level of variation of the signal U is extracted. To do this, the quasi-static variation <U> of the signal U over the time window F is initially determined. In FIG. 2, the quasi-static variation <U>(T) of the signal U at an instant T is determined as being equal to the mean value of U over the local time window F. Nevertheless, this definition is not limiting: for example, the quasi-static variation <U> may also designate the mean value plus the lower harmonics of the signal U over the time window F, or the first terms of a limited development of U. In other words, <U> is to represent the portion of the signal U that varies slowly, if at all. The quasi-static variation <U> in the signal U over the time window F can be extracted by means of a lowpass filter that may be analog or digital, or by means of a computer.

If a lowpass filter is used, e.g. of first or second order, the person skilled in the art determines the cutoff frequency as explained above, as a function of the resonant frequencies or of the behavior of the system from which the signal is extracted. For example, for a damped linear system of second order, it is known that the time for passing from 10% to 90% in response to a step is about 2.2/Pc, where Pc is the resonant angular frequency of the system. Thus, for a 2.2 second (s) transient, a resonant angular frequency should be used that is equal to 1 radian per second (rd/s), i.e. about 0.15 hertz (Hz).

In addition, for increased robustness, it is possible to apply a margin to the resonant frequency that is obtained in order to be sure that the lowpass filter does not smooth the signal excessively. In the above example, it is possible to double the resonant frequency in order to obtain the cutoff frequency, i.e. specifically to use a cutoff angular frequency equal to 0.3 Hz.

Thereafter, the level of variation Δ<U> of the signal U is extracted. This level of variation Δ<U> represents slow variations in the signal U. For example, as shown in FIG. 2, the level of variation Δ<U> may be the derivative of the quasi-static variation <U>. More simply, the level of variation Δ<U> may be the rate of increase of <U> during one time step Δt, i.e.:

$$\Delta\langle U\rangle(T)=(\langle U\rangle(T)-\langle U\rangle(T-\Delta t))/\Delta t$$

This formula is particularly adapted for a discrete signal, but it may also be used for a continuous signal.

In this example, the level of variation Δ<U> is determined on the basis of the quasi-static variation <U> of the signal U. Depending on the type of signal U, it may suffice to determine the level of variation directly on the basis of the signal U, in which case it is written ΔU. When the level of variation corresponds to a rate of increase, it may be determined using the following formula:

$$\Delta U(T)=(U(T)-U(T-\Delta t))/\Delta t$$

In practice, since the time step Δt is constant during the various iterations of the method, there is no need to divide by Δt in the above formulas. Furthermore, more complex formulas can be used for measuring the level of variation. It is advantageous to take account of the dynamic aspect of the signal in order to distinguish between transient states and stable states; the behavior of the system from which the signal U is taken may differ depending on its state, and the information characterizing the signal U may depend on the stable or non-stable nature of the current state.

Furthermore, and possibly in a manner that is independent of step C, the vibration rating of the signal is determined (step B). This operation is performed in parallel with step C. More generally, it may be performed before, simultaneously with, or after step B. Step B comprises substeps B1 and B2.

During step B1, the vibration content Û is extracted from the signal U. To do this, the mean value and possibly also its lower frequency harmonics over the time window F are subtracted from the signal U. The value subtracted from the signal U may be the value of quasi-static variation <U> as determined during step C. It could also be some other value, in which case steps B and C are independent. The vibration content Û of the signal U over the time window F may be extracted by means of a highpass filter that may be analog or digital, or by means of a computer, e.g. using a fast Fourier transform algorithm. The vibration content is then calculated on the basis of components of the signal at frequencies that are greater than the cutoff frequency set for the highpass filter. The cutoff frequency of the highpass filter may be greater than or equal to the cutoff frequency of the lowpass filter used for calculating the variation level. When the cutoff frequency of the highpass filter is strictly greater than the cutoff frequency of the lowpass filter, the frequency range lying between the two cutoff frequencies is an uncertainty range in which the frequencies may be representative both of the behavior of the system from which the signal is extracted and also of noise. Furthermore, the cutoff frequency of the highpass filter may be selected to have a certain value by the person skilled in the art when that person has knowledge about critical phenomena that appear at said value.

The extracted vibration content Û is a signal of zero mean corresponding to the medium and high frequencies of the signal U. At this stage of the method, it is important not to retain only one frequency, but rather a set of medium and high frequencies in order to have a correct representation of the tendency of the signal U to fluctuate about its mean value or of its quasi-static variation. Thus, the vibration content Û is a signal of mean that is zero.

Thereafter, during step B2, the vibration rating σ of the signal U at instant T is calculated as being equal to a normalized value of the vibration content Û over the time window F. In the present implementation, the normalization that is used is the standard deviation σ, which is defined as the square root of the variance:

$$\sigma(T) = \sqrt{\frac{1}{D}\int_{T-D}^{T} \hat{U}(t)^2 dt}$$

Standard deviation is a normalizing operation of second order, involving a square and a square root, and it is representative of variations of the vibration content Û around its mean value, which, specifically, is zero. Other normalizing operations could be used, having other meanings. For example, a normalizing operation of third order would give information about the asymmetry of the vibration content Û. A normalizing operation of fourth order would give information about the flattening of the vibration content Û. The normalizing operation that is selected depends on the type of information that it is desired to obtain. When normalizing is used for determining the vibration rating, it is advantageous to use a second order operation for normalizing the vibration content as the vibration rating, e.g. standard deviation. Second order normalizing operations other than standard deviation can be used for calculating the vibration rating, in compliance with the extended definition given above for normalizing.

As can be seen in FIG. 2, calculating the vibration rating by normalizing over a moving time window leads to smoothing between the vibration content Û and the vibration rating σ. The vibration rating is thus less noisy than the vibration content; it provides more global information about the signal U.

In order to increase the speed of step B2 during an iteration of the method, it is possible to calculate the standard deviation recursively. Thus, when considering an instant T+ΔT, and assuming that the method has already been performed for an instant T, then the standard deviation at instant T+ΔT can be calculated without using all of the values of the vibration content Û contained in the time window F going from [T+ΔT−D, T+ΔT], but using only the values of the vibration content Û that lie in the ranges J1=[T−D, T+ΔT−D] and J2=[T, T+ΔT] together with the standard deviation as calculated at instant T.

It is easy to show that:

$$\sigma(T+\Delta T) = \sqrt{\sigma(T)^2 - \frac{1}{D}\int_{T-D}^{T+\Delta T-D} \hat{U}(t)^2 dt + \frac{1}{D}\int_{T}^{T+\Delta T} \hat{U}(t)^2 dt}$$

Figure 3:
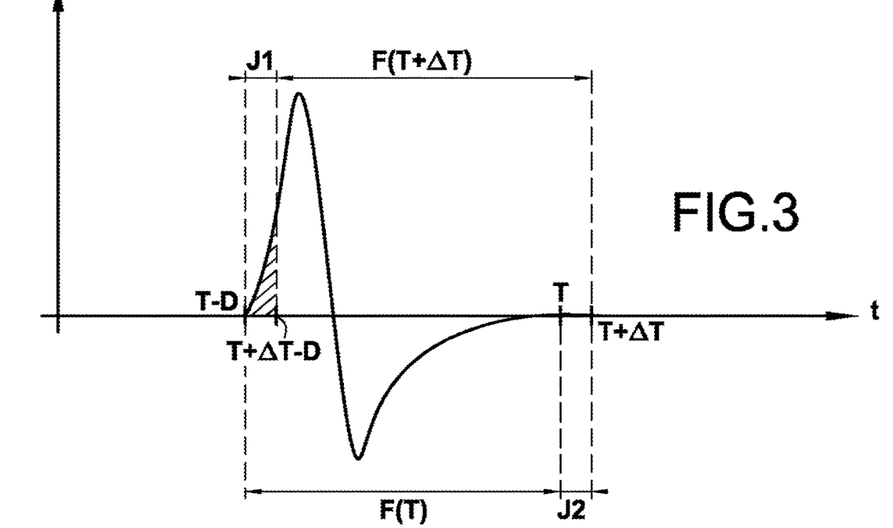
FIG. 3 is a detail of FIG. 2, showing how vibration rating is calculated recursively.

As shown in FIG. 3, this calculation can be interpreted as follows: σ(T+ΔT) is calculated from σ(T) by subtracting (or adding as the case may be) the terms leaving the moving time window F (or entering it as the case may be). The ranges J1 and J2 of amplitude ΔT may be much smaller than the time window F of amplitude D, thereby greatly accelerating the calculation of integrals. The advantage of this method is further increased when using a discrete signal, insofar as the integrals of the above formula are replaced by easily accessible values of the vibration content Û:

$$\sigma(T+\Delta T) = \sqrt{\sigma(T)^2 - \frac{\Delta T}{D}\hat{U}(T-D)^2 + \frac{\Delta t}{D}\hat{U}(T+\Delta T)^2}$$

As can be seen in FIG. 1, once the level of variation Δ<U> (step C) and the vibration rating σ (step B) have been determined, it is possible to determine information that characterizes the signal by applying a determination function that takes as its arguments at least the vibration rating and the level of variation (step D). In the present implementation, the determination step D includes prior steps DB and DC of determining indicators.

Figure 4:
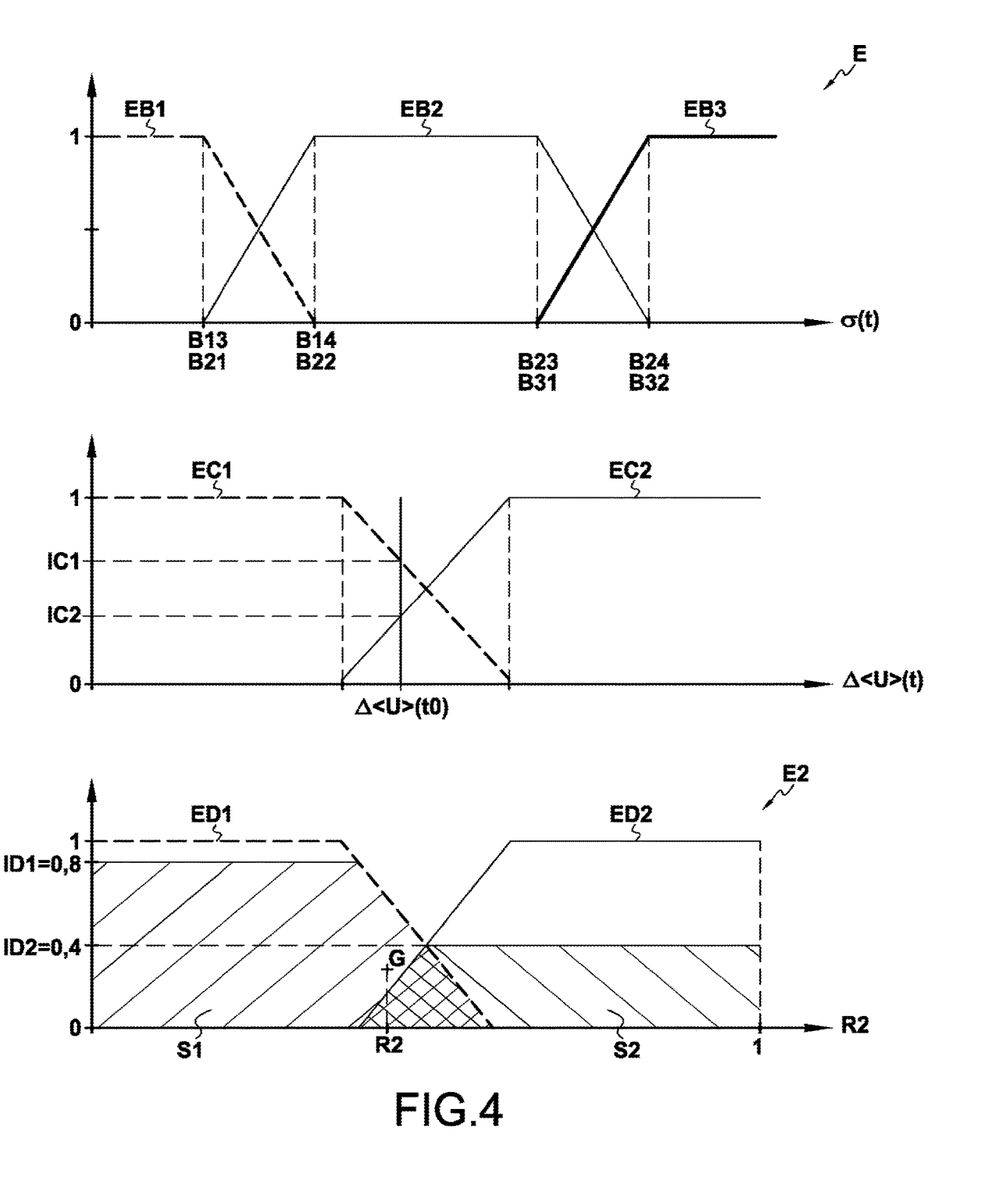
FIG. 4 is a diagram showing a predetermined correspondence table between indicators and respectively the vibration rating, the level of variation, and a confidence index.

As shown in FIG. 4, for the vibration rating σ and the level of variation Δ<U>, a predetermined table E is available on the basis of which the five indicator values are determined. For the vibration ratings σ obtained in step B, table E contains the data necessary for calculating three indicators EB1, EB2, and EB3. The indicator EB1 is representative of the fact that the vibration rating σ is low: its value is 1 when it is indeed low, and decreases from 1 to 0 when the vibration rating increases from a value B13 at which it is considered that it is still indeed low (EB1=1), to a value B14 at which it is considered that it is no longer low (EB1=0), and it remains equal to 0 beyond said value B14. The indicators EB2 and EB3 operate on the same principle. They are representative respectively of the fact that the vibration rating σ is medium or high. Table E also has the data needed for calculating two indicators EC1 and EC2 for the level of variation Δ<U> obtained in step C. The indicators EC1 and EC2 are representative respectively of the fact that the level of vibration Δ<U> is low or high. The values of the indicators EC1 and EC2 follow the same pattern as the values of the indicators EB1 and EB3. The indicators of the predetermined table E are thus values in the range [0, 1]. The range [0, 1] is selected in this example for practical reasons, however any range could be used.

FIG. 4 shows the five indicators EB1, EB2, EB3, EC1, and EC2 as a function respectively of the vibration rating σ and of the level of variation Δ<U>. As can be seen in FIG. 4, each indicator may be represented by a trapezoid that is determined by four points. For example, the indicator EB2 is determined by four respective abscissa points B21, B22, B23, and B24 having respective ordinate values 0, 1, 1, 0. The top right corner of the indicator EB1 has abscissa value B13 and the bottom right corner of the indicator EB1 has abscissa value B14. In the example of FIG. 4, B13 is selected to be equal to B21 and B14 is equal to B22, however at least one of these equalities need not apply. Nevertheless, if it is desired for the indicators to provide a complete description of the signal, it is preferable for them to overlap; thus, care should be taken for example to ensure that the abscissa value B14 is greater than the abscissa value B21, and likewise that the abscissa value B24 is greater than the abscissa value B31 of the bottom left corner of the indicator EB3.

The table of indicators E is predetermined, i.e. determined before performing the method of characterizing the signal, but the values of the indicators may be calculated dynamically from the extents of the signals U, Δ<U>, and/or σ. By way of example, it would be absurd to use the same medium level indicator EB2 of value 1 when the vibration rating lies in the range 5 to 10, with two vibration ratings σ1 and σ2, σ1 varying over the range 0 to 2 and σ2 varying over the range −50 to +50. That is why it is possible to make the abscissa values of the corners of the trapezoid proportional, by way of example, to the extent of the vibration rating under consideration. It can thus be understood that the table E need not be filled with predetermined fixed values, but rather using predetermined relationships (or functions). Said relationships are not necessarily proportionality relationships.

FIG. 4 shows indicators of trapezoidal shape, however that is not the only possible shape. The indicators may implement any function. For example, the portion of the indicator EB2 lying between the abscissa points B21 and B22 may be quadratic instead of being linear, it may have any other shape.

By using the predetermined table E, it is possible at each instant T to calculate the values of the indicators that are associated with the vibration rating σ(T). Three indicators IB1, IB2, and IB3 are then constructed using the formula IBi(T)=EBi(σ(T)), where i takes the values 1, 2, and 3. Likewise, at each instant T, the values of the indicators associated with the level of variation Δ<U>(T) are calculated. Two indicators IC1 and IC2 are thus constructed using the formula ICi(T)=EBi(Δ<U>(T)), where i takes the values 1 and 2. An example of constructing indicators IC1 and IC2 at an instant t0 is shown in FIG. 4. The indicators IB1, IB2, IB3, IC1, and IC2 having the curves as a function of time that are shown in the bottom portion of FIG. 2, are thus time functions representative of the vibration rating σ and the level of variation Δ<U>.

In the vocabulary of fuzzy logic, the indicators are known as linguistic variables. Steps DB and DC consist in associating the vibration rating σ and the level of variation Δ<U> with indicators that are functions of time and that represent a level of matching firstly between the vibration rating and the level of variation, and secondly the linguistic variables. Such steps are sometimes referred to as "fuzzification". In other words, and by way of example, starting from the low level indicator EB1, the indicator IB1 indicates as a function of time how low the vibration rating is. The use of continuous indicators, as described above, makes it possible to describe the vibration rating and the level of variation in a manner that is more refined than if Boolean indicators were to be used. Better use is thus made of differing grades of vibration rating and of level of variation.

Once the indicators IB1, IB2, IB3, IC1, and IC2 of the vibration rating σ and of the level of variation Δ<U> have been determined (steps DB and DC), they are combined. In the device described, they are combined in two different manners (steps D1 and D2) in order to obtain two different pieces of information R1 and R2 that are complementary and that are useful for characterizing the signal U. The two pieces of information R1 and R2 are independent and can thus be calculated in parallel, thereby reducing the total time required for executing the method. Furthermore, even though the present implementation is restricted to calculating two pieces of information R1 and R2, it is possible to determine only a single piece of information R1 during a single step D1, or to calculate at least three pieces of information R1, R2, and R3, etc. during at least three corresponding steps D1, D2, and D3, etc. Each step D1, D2 can thus make use of all or some of the indicators determined during the steps DB and DC.

The vibration rating σ, as information quantifying rapid fluctuations of the signal U, and the level of variation Δ<U> as information quantifying slow variations of the vibrations U are thus complementary. Thus, the indicators that result therefrom make it possible to characterize the signal U in more refined manner: it is possible to identify not only typical states of the signal U, e.g. a nominal state characterized by a low level of variation and a medium vibration rating, but also to identify states in which the signal U is halfway between a plurality of typical states. In the present implementation, each of the states D1 and D2 combines at least one indicator relating to the level of variation and at least one indicator relating to the vibration rating.

Thus, during a step D1, a first piece of information R1 is calculated using fuzzy logic tools. In this example, this first piece of information R1 is a "degree of failure". In the example described, the signal U is characteristic of a failure of the system or of the measuring channel in the event its vibration rating being high while its level of variation is low. Step D1 then consists in performing the following calculation: R1=F1(IB3, IC1). By way of example, the function F1 is a fuzzy AND (R1=IB3 AND IC1), and the function F1 is then interpreted as follows: the degree of failure R1 is high if the vibration rating is high AND if the level of variation is low. In the method used, there are several ways of implementing a fuzzy AND. For example, as shown in the graphical representation of FIG. 4, the fuzzy AND is calculated as being a minimum (R1=min{IB3, IC1}). The fuzzy AND could also be product (R1=IB3×IC1).

The situation described involves the function F1 using a fuzzy operator to combine indicators relating to a level of variation and to a vibration rating, however it is possible to use other functions for combining indicators relating to the level of variation and indicators relating to the vibration rating. By way of example, a conventional threshold may be used for calculating an indicator that is a function of the vibration rating. For example, if the vibration rating is less than a low value, it can be deduced that the signal is flat or peak-limited, which can be indicative of a failure for certain types of system. This indicator is then combined with an indicator that is a function of the level of variation in order to confirm the value for the degree of failure of the system.

During a step D2 parallel with step D1, a confidence index R2 is calculated from some or all of the indicators IB1, IB2, IB3, IC1, and IC2. As described below, in certain implementations, the confidence index R2 is calculated from the indicators IB2 and IC1. Specifically, this confidence index R2 represents the confidence that an operator or a post-processing system can give to the piece of information R1 as deduced in step D1. The confidence index is high if the signal U is judged to be reliable. For example, the signal U is judged to be more reliable when its vibration rating σ is medium and its level of variation Δ<U> is low. Specifically, whenever the level of variation is not low, that means the system from which the signal U is acquired is in a transient stage during which it is difficult to deduce a failure state, even when the vibration rating is low or high, insofar as measurement delay or physical inertia in the system can disturb characterizing the signal U. Thus, by combining the vibration rating and the level of variation in order to calculate a confidence index, false detections can be avoided.

The confidence index R2 is calculated simply using the medium vibration rating indicator IB2 and the low level of variation indicator IC1 using the formula: R2=IB2 AND IC1. In the method used, the fuzzy AND may be calculated as a minimum, as a product, or as any other suitable function in the content of fuzzy logic: in the present example, the relationship used is R2=IB2×IC1. This implementation is particularly simple while also being effective. Because of the simplicity of the calculations in the various steps, it is also easy to implement and very fast.

In this implementation, during step D2, the confidence index R2 is calculated directly from indicators relating to the vibration rating σ and to the level of variation Δ<U>. Nevertheless, there are more elaborate ways of determining the confidence index R2, or more generally of determining information characterizing the signal U. Thus, in another implementation, during step D2, the time variations of the indicators ID1 and ID2 representative of the confidence index R2 are initially determined on the basis of the indicators for the vibration rating σ and for the level of variation Δ<U>. Although the confidence index R2 is still unknown at this stage of the method, the resulting indicators ID1 and ID2 enable the confidence index R2 to be qualified: ID1 is an indicator of a confidence index that is low and ID2 is an indicator of a confidence index that is high. Once the time variation of the indicators ID1 and ID2 has been determined, then during a second step, the value of the confidence index R2 is reconstructed on the basis of these associated representative indicators.

In order to calculate the time variations of the indicators ID1 and ID2, it is necessary to have fuzzy inference rules available. The fuzzy inference rules make it possible to obtain information about the confidence index R2 in the form of indicators ID1 and ID2 that are representative thereof on the basis of known data, i.e. the other indicators IB1, IB2, IB3, IC1, and IC2 (or on the basis of information about the vibration rating σ and the level of variation Δ<U>). A fuzzy inference rule is a fuzzy logic operator that is in the form of an implication, for example: "if the level of variation is high (IC2), then the confidence index is low (ID1)". This rule consists in a logical translation of an empirical observation, i.e. the fact that when the system is in a transient state, it is difficult to be certain about detecting a failure state. In a fuzzy inference rule, the necessary condition (the conclusion, in this example "the confidence index is low") has the same degree of exactitude as the sufficient condition (the premise, in this example "the level of variation is high"). In other words, the fuzzy inference rule given as an example corresponds to the equality ID1=IC2. For this fuzzy inference rule, if the high level of variation indicator IC2 is 0.8, then the low confidence index indicator ID1 is 0.8.

Another fuzzy inference rule used in this implementation is: "if the level of variation is low and the vibration rating is high, then the confidence index is high". This rule is used in the same manner as the preceding rule, except that it is necessary to begin by using a fuzzy AND in order to determine the value of the premise "the level of variation is low AND the vibration rating is high". In other words, this second fuzzy inference rule corresponds to the equality ID2=IC1 AND IB3. For example, once this fuzzy AND has been applied, it is calculated that the value of such a premise is 0.4. Thus, in this example, the confidence index is characterized by the values ID1=0.8 and ID2=0.4.

In certain implementations, the values ID1 and ID2 are considered as being information characterizing the signal U, and they are output directly from the step D2 by the method that then stops or moves onto the following iteration. Nevertheless, in certain other implementations, the values of the indicators ID1 and ID2 are not output as such; the value of the confidence index R2 is obtained by a function that takes as its arguments the two indicators ID1 and ID2, which are themselves representative of the confidence index R2. Several methods, known as "defuzzification", exist for performing such an operation. Conversely to the fuzzification operation that consists in associating the indicators IB1, IB2, IB3, IC1, and IC2 with the values for the vibration rating σ and the level of variation Δ<U>, the defuzzification operation consists in reconstructing the confidence index R2 from the indicators ID1 and ID2.

To reconstruct the confidence index R2 from the indicators ID1 and ID2, a table E2 is established in advance comprising two linguistic variables (indicators) ED1, ED2 relating to the confidence index R2 and corresponding to the indicators ID1 and ID2; whereas the indicators ID1 and ID2 are functions of time, the indicators ED1 and ED2 are expressed as a function of the confidence index R2 using the following relationships: ID1(t)=ED1(R2(t)) and ID2(t)=ED2(R2(t)). In FIG. 4, there can be seen the two indicators ED1 and ED2 that correspond to confidence levels that are low and high respectively.

R2 is then calculated from ID1, ID2, and from ED1, ED2 by a defuzzification method. In the present implementation, the defuzzification method that is used is known as the center-of-gravity method. In this method, the value of the confidence level R2 is the abscissa value of the center of gravity of the union of surfaces S1 and S2 defined as follows: the surface S1 is the surface lying between the abscissa axis and the curve for the indicator ED1, for ordinate values that do not exceed the value ID1. Likewise, the surface S2 is the surface lying between the abscissa axis and the curve for the indicator ED2, for ordinate values not exceeding the value ID2. These two surfaces S1 and S2 are shaded in FIG. 4 for the present example. The center of gravity G of the shaded surface has an abscissa value R2 which is the looked-for confidence index. Methods other than the center-of-gravity method can be used for reconstructing a confidence index value R2 from indicators ID1 and ID2. In addition, it is possible to use more than two indicators, providing a predetermined table E is available having a corresponding number of linguistic variables and fuzzy inference rules.

As explained above, the method is generic in nature and can be adapted to signals of all types. The use of indicators makes it possible to characterize the signal more accurately and to take failure criteria into account better.

Figure 5:
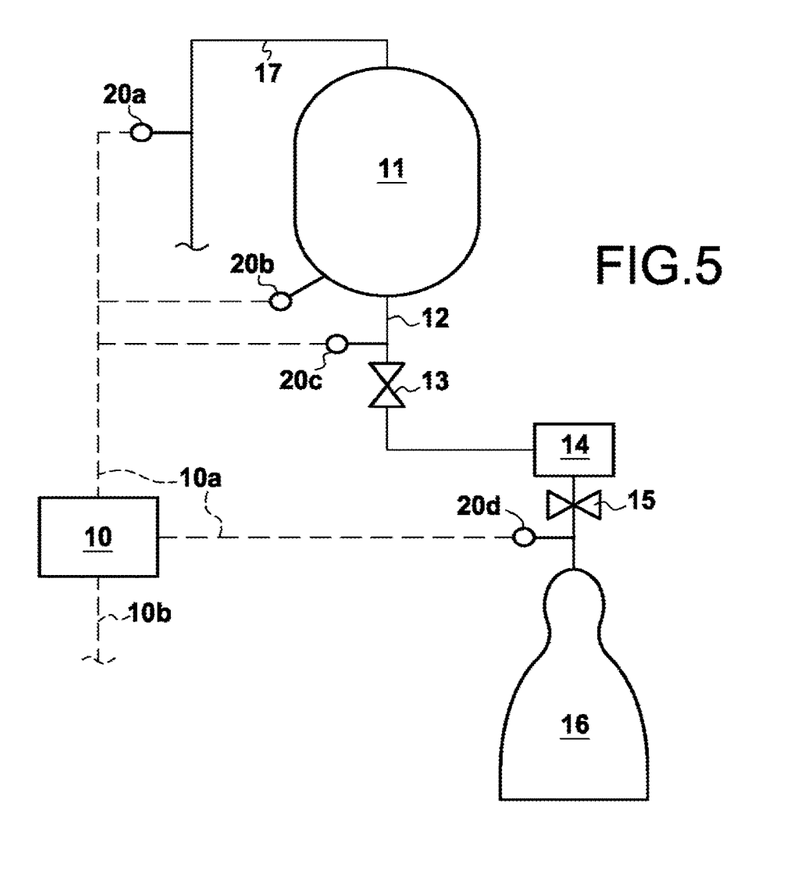
FIG. 5 is a diagrammatic view showing how a signal characterization device of the invention is installed.

FIG. 5 shows an example of how a signal characterization device of the invention can be installed. Specifically, it shows a rocket engine having a tank 11 and a feed pipe 12 with a feed valve 13 and a pump 14, the feed pipe extending between the tank 11 and a nozzle 16. A control valve 15 is situated between the pump 14 and the nozzle 16. In addition, a pressurizer pipe 17 is connected to the tank in order to keep it under pressure.

The rocket engine also has a device 10 for characterizing the signal. The signal characterization device 10 comprises input cables 10a for acquiring data and an output cable 10b for transmitting data. The cables 10a are connected to sensors 20a, 20b, 20c, 20d placed at various locations on the rocket engine and they send various signals to the signal characterization device 10. The signal characterization device 10 comprises:
  signal acquisition means, including in particular a data acquisition card for acquiring data transmitted by the cables 10a (which data constitutes the signal); and
  a computer, which applies a data processing program to the acquired signal and thus constitutes simultaneously means for determining a vibration rating suitable for determining a vibration rating of at least a portion of the acquired signal, means for determining a level of variation suitable for determining a level of variation of at least a portion of the acquired signal, and means for determining information characterizing the acquired signal, suitable for determining information characterizing the signal by applying a function that has as its arguments at least the vibration rating and the level of variation.

The signal characterization device 10 thus makes it possible to perform the signal characterization method of the invention. In particular, the computer serves to perform the steps of the method corresponding to FIG. 1 as described above. It can apply this method to all or some of the signals it receives. The information characterizing the signal is then transmitted via the output data transmission cables 10b.

The rocket engine of FIG. 5 and the locations of the sensors 20a, 20b, 20c, 20d are merely examples of how a signal characterization device of the invention can be applied and installed. A signal characterization device of the invention may be used on any type of equipment that delivers a signal.

The invention claimed is:

1. A method of characterizing a signal produced by acquisition means connected to equipment, the method comprising: A) acquiring a signal using the acquisition means; B) determining a vibration rating of at least a portion of the signal acquired in step A, the vibration rating being a function solely of rapid fluctuations of the signal, excluding information representing slow variations of the signal, the vibration rating being equal to a normalized value of a vibration content over a time window, the vibration content being extracted by from the signal acquired in step A; C) determining a level of variation of at least a portion of the signal acquired in step A, the level of variation being representative of slow variations of the signal, the level of variation being equal to a rate of increase of a quasi-static variation of the signal over the time window during one time step; and D) determining information characterizing the signal by applying at least two different functions that combine at least said vibration rating and said level of variation, wherein the quasi-static variation of the signal is equal to a mean value of the signal acquired in step A over the time window.

2. The method of characterizing a signal according to claim 1, wherein values of at least one indicator are calculated, from at least one of the vibration rating and the level of variation; and information characterizing the signal is determined in step D from said at least one indicator.

3. The method of characterizing a signal of claim 2, wherein the values of the at least one indicator are calculated using a predetermined table.

4. The method of characterizing a signal according to claim 1, wherein the signal comprises calculated information.

5. The method of characterizing a signal according to claim 1, wherein the signal comprises information obtained using at least one sensor.

6. The method of characterizing a signal according to claim 1, wherein the vibration rating and the level of variation are determined for a common portion of the signal.

7. The method of characterizing a signal according to claim 1, wherein, in step D, the functions combine the vibration rating and the level of variation by using at least one of a threshold, an arithmetic operator, a Boolean operator, and a fuzzy logic operator.

8. The method of detecting failures in which a failure is detected on the basis of at least one piece of information obtained by the method according to claim 1.

9. A non-transitory computer readable data medium storing a computer program including instructions for executing steps of a method according to claim 1.

10. The method of characterizing a signal according to claim 1, wherein the vibration content is a signal of zero mean corresponding to medium and high frequencies of the signal acquired in step A.

11. The method of characterizing a signal according to claim 1, wherein said information comprises a first piece of information designating a state of the signal and a second piece of information designating a confidence index to be given to said state of the signal.

12. A device for characterizing a signal, the device comprising:
a data acquisition card which acquires a signal and configured to be connected to equipment; and
circuitry configured to
determine a vibration rating, suitable for determining a vibration rating of at least a portion of the acquired signal, the vibration rating being a function solely of rapid fluctuations of the signal, excluding information representing slow variations of the signal, the vibration rating being equal to a normalized value of a vibration content over a time window, the vibration content being extracted from the signal;
determine a level of variation suitable for determining a level of variation of at least a portion of the acquired signal, the level of variation being representative of slow variations of the signal, the level of variation being equal to a rate of increase of a quasi-static variation of the signal over the time window during one time step; and
determine information characterizing the acquired signal and suitable for determining information characterizing said signal by applying at least two different functions combining at least said vibration rating and said level of variation,
wherein the quasi-static variation of the signal is equal to a mean value of the signal acquired by the data acquisition card over the time window.

* * * * *